United States Patent [19]
Asadi et al.

[11] Patent Number: 6,129,005
[45] Date of Patent: Oct. 10, 2000

[54] PISTON FOR A PISTON-CYLINDER UNIT

[75] Inventors: Hasan Asadi, Schweinfurt; Gerald Fenn, Pfersdorf; Herold Schneider, Sulzheim, all of Germany

[73] Assignee: Mannesmann Sachs AG, Schweinfurt, Germany

[21] Appl. No.: 09/132,973

[22] Filed: Aug. 12, 1998

[30] Foreign Application Priority Data

Aug. 14, 1997 [DE] Germany .......................... 197 35 248

[51] Int. Cl.$^7$ .............................................. F01B 31/00
[52] U.S. Cl. .............................................. 92/183; 92/128
[58] Field of Search ................... 92/128, 181 R, 92/181 P, 183, 184

[56] References Cited

U.S. PATENT DOCUMENTS

| | | | |
|---|---|---|---|
| 1,234,972 | 7/1917 | Trist ........................................... | 92/183 |
| 1,955,157 | 4/1934 | Wayne ..................................... | 92/184 X |
| 2,332,763 | 10/1943 | Stewart ...................................... | 92/183 |
| 2,587,091 | 2/1952 | Barnes et al. .............................. | 92/184 |
| 3,132,568 | 5/1964 | Strader .................................... | 92/184 X |
| 3,339,834 | 9/1967 | Palmer ....................................... | 92/184 |
| 3,426,655 | 2/1969 | Rumsey ...................................... | 92/183 |
| 3,444,965 | 5/1969 | Dobkins ................................. | 92/128 X |
| 3,994,604 | 11/1976 | Visser ........................................ | 92/128 X |
| 4,238,009 | 12/1980 | Wossner et al. ....................... | 92/128 X |
| 5,259,294 | 11/1993 | May ....................................... | 92/181 P |

FOREIGN PATENT DOCUMENTS

| | | |
|---|---|---|
| 1104016 | 12/1954 | France ..................................... 92/183 |
| 1 142 471 | 1/1963 | Germany . |
| 1 575 232 | 1/1970 | Germany . |
| 2 059 682 | 6/1972 | Germany . |
| 44 10 996 C1 | 6/1995 | Germany . |

*Primary Examiner*—John E. Ryznic
*Attorney, Agent, or Firm*—Cohen, Pontani, Lieberman & Pavane

[57] ABSTRACT

A piston for a piston-cylinder unit comprises a piston body having passages which connect two spaces in a cylinder on opposing sides of the piston. The passages are covered by at least one valve disk which is centered relative to a center of the piston by a centering sleeve. A spring element is arranged between the piston body and the centering sleeve. This spring element, when mounted, spaces the centering element from the piston body and accordingly displaces the useful range of the centering element until the piston is assembled in its entirety and every structural component part of the piston occupies its intended position.

4 Claims, 2 Drawing Sheets

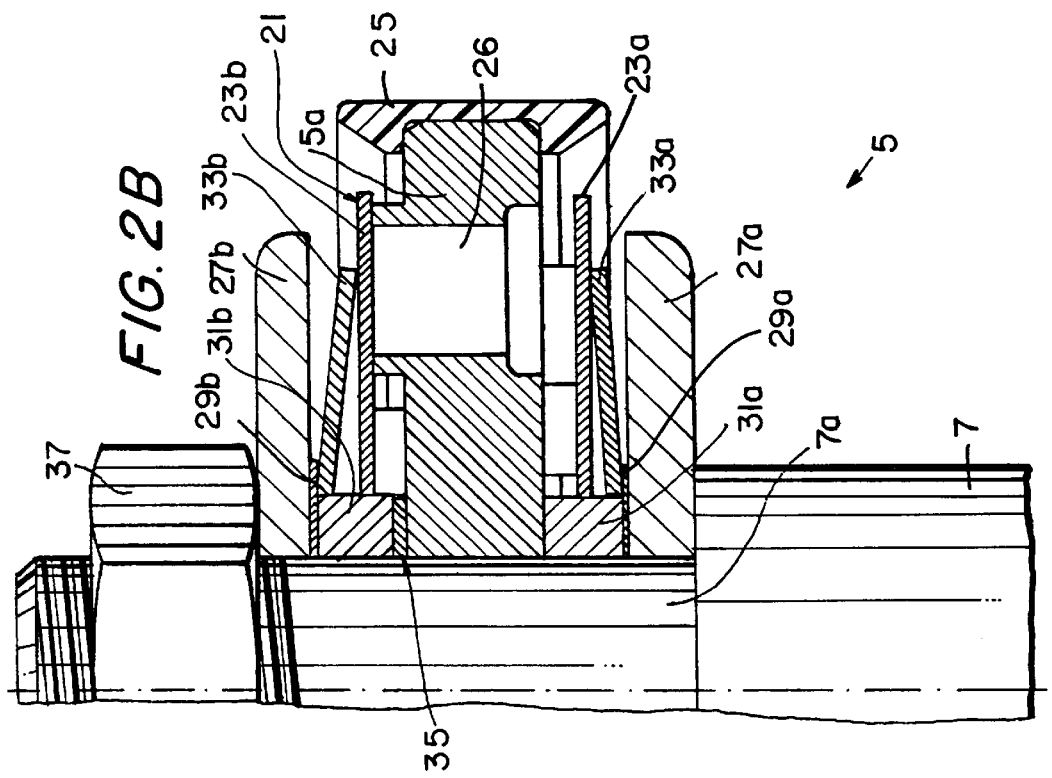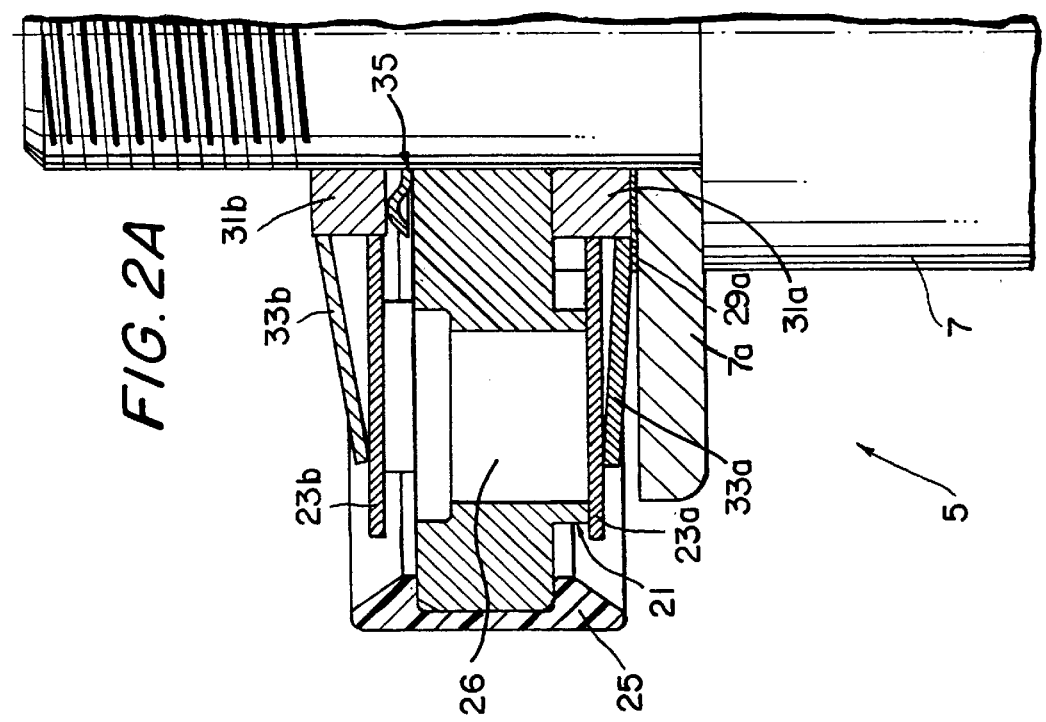

PISTON FOR A PISTON-CYLINDER UNIT

BACKGROUND OF THE INVENTION

1. Field of the Invention

The invention relates to a piston for a piston-cylinder unit.

2. Description of the Related Art

A prior art piston for a piston-cylinder unit is disclosed in DE 44 10 996 C1. This prior art piston comprises a piston body having passages which connect two spaces on either side of the piston filled with a medium, wherein the passages are covered by at least one disk which is centered relative to the center of the piston by a centering sleeve during assembly.

In the part of the description relating to variants V1 and V2, it is noted that the centering of the valve disks and the spring disk(s) during assembly is a problem worthy of consideration. In variant V1, a centering sleeve is used to position the disk springs during assembly, because the ring 39 located at the inner diameter, which centers the disk when the piston is in the assembled state, cannot assume a centering function when the disk springs are not in a pretensioned state. The height of the disk springs when they are not pretensioned is greater than that of the ring 39. The centering sleeve is an additional tool which must be removed after the piston is assembled.

In variant V4, an angle ring is used. An angle ring of this kind with the required tolerances is produced by cutting and not by stamping techniques. Cutting operations are more expensive than stamping. Therefore, the angle ring is expensive to produce.

SUMMARY OF THE INVENTION

It is the object of the present invention to provide a piston for a piston-cylinder unit which solves the problem known from the prior art in a simple manner.

According to an embodiment of the invention, the object is met in that a spring element is arranged between a piston body and a centering sleeve, wherein this spring element, when mounted, lifts the centering element and accordingly displaces the useful range of the centering element during assembly until the piston is assembled in its entirety and every structural component part has assumed its intended position. Accordingly, a shielded disk spring which is not pretensioned is centered during the assembly process without requiring additional tools or devices.

The present invention has proven particularly advantageous when the spring element is constructed as a wave spring. The wave spring provides a good support for additional structural component parts such as, e.g., the centering sleeve. On the whole, springs with a support surface at its ends are preferred.

Depending on the intended damping forces, the centering elements may have the same height on both sides of the piston. Since only one type of centering element is required, the multiplicity of parts is reduced.

In a further embodiment, at least one planar supporting disk is associated with the shielded disks, wherein a tilting disk is inserted between the shielded disks and the supporting disk. A tilting point of the shielded disks, which are shielded by the piston when flow is directed against them, is defined by the outer diameter of the tilting disk. The tilt circle is adjustable in a very precise manner. This results in very simple structural component parts which can be adapted to individual vehicle types in many combinations.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2A is a sectional view of the piston of FIG. 1 during assembly; and

FIG. 2B is a sectional view of the piston of FIG. 1 in the fully assembled state.

DETAILED DESCRIPTION OF THE PRESENTLY PREFERRED EMBODIMENTS

Figure 1:
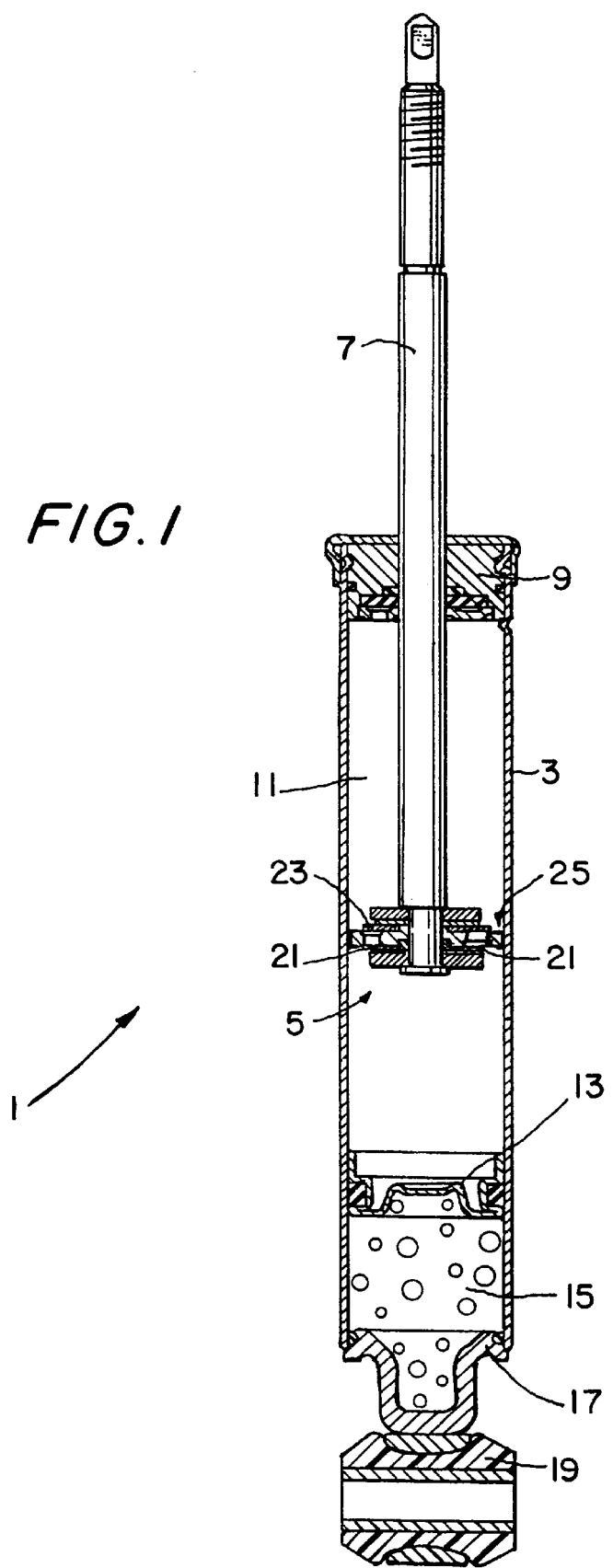
FIG. 1 shows a longitudinal sectional view of a shock absorber having a piston according to an embodiment of the present invention.

Referring to FIG. 1, a piston-cylinder unit 1 is shown, by way of example, in the construction of a single-tube shock absorber for a vehicle. The principle of the present invention may also be applied in other types of piston-cylinder units.

The piston-cylinder unit 1 comprises a pressure tube 3 in which a piston 5 is arranged on an end of a piston rod 7, so that the piston 5 is axially movable. The piston rod 7 is guided through a piston rod guide 9 mounted at an outlet side of the pressure tube 3. The piston rod guide 9 closes a work space 11 which is filled with a damping medium and separated by a dividing piston 13 from a gas space 15 which is located adjacent a base 17 of the pressure tube 3. A head 19 is connected to the end of the base 17.

During a movement of the piston rod 7, the damping medium in the working space 11 is forced through damping valves 21 in the piston 5 which are formed by valve disks 23. A piston ring 25 which covers a circumferential surface of the piston 5 prevents lateral flow of the damping medium around the piston 5.

Referring now to FIG. 2A, the piston 5 is shown in the partially assembled state on the piston rod 7, with the piston rod 7 pointing downward. During assembly, a lower supporting disk 27a, a lower tilting disk 29a and a lower centering sleeve 31a are mounted prior to this assembly state. These structural component parts are centered on a piston rod pin 7a. A lower valve disk 23a and a lower disk spring 33a are centered in turn at the lower centering sleeve 31a whose height is greater than the height of the untensioned lower disk spring 33a and the disk thickness of the lower valve disk 23a, so that a centering function is effected for both components.

A piston body 5a having through holes 26 and the piston ring 25 is centered in turn at the piston rod pin 7a above the lower centering sleeve 31a. A spring element 35 is placed on the piston body 5a. A wave spring is particularly suitable as the spring element 35. An upper centering sleeve 31b is placed on the spring element 35. The spring element 35 has only a very small spring rate/spring force because it need only carry the upper centering sleeve 31b. An upper valve disk 23b and an upper disk spring 33b are centered about the upper centering sleeve 31b. The height of the spring element 35 is dimensioned in such a way that both the upper valve disk 23b and the upper disk spring 33b are centered on the upper centering sleeve 31b during assembly. The centering sleeves 31a and 31b of both sides of the piston 5 have the same height in the preferred embodiment. However, the centering sleeves 31*a* and 31*b* may have different heights depending upon the particular requirements of the piston-cylinder unit in which they are used.

An upper tilting disk 29*b* is placed on the upper centering sleeve 31*b* so that it adjoins an upper supporting disk 27*b*. The upper tilting disk 29*b* and the upper supporting disk 27*b* are centered at the piston rod pin 7*a*. When the piston is biased and, for example, closed by a piston nut 37 (see FIG. 2B), the upper supporting disk 27*b* and the upper tilting disk 29*b* are advanced toward the piston body 5*a* against the force of the disk springs 33*a* and 33*b*. The spring force of the spring element 35 is negligible during this process and can be entirely left out of consideration.

In FIG. 2B, the piston 5 is shown in the fully assembled state. The spring element 35 is pressed flat in this state. The effect of the tilting disks 29*a* and 29*b* can be seen in this view. When, for example, the upper disk spring 33*b* is further pretensioned by the lifting of the upper valve disk 23*b*, the upper disk spring 33*b* first assumes a flat position under certain conditions and then lies on the upper valve disk 23*b*. At a higher loading of the upper disk spring 33*b*, the upper disk spring 33*b* tilts over the outer edge of the upper tilting disk 29*b*. At this point, the application of force is shifted and a spring force required for further tensioning of the upper disk spring 33*b* to tilt the upper disk spring 33*b* over the outer edge of the upper tilting disk requires a distinct force increase. The outer diameter of the upper tilting disk 29*b* is easily adjusted in a very precise manner to the requirements of a particular application. Consequently, the tilt radius of the upper tilting disk 29*b* will also be very exact. The lower tilting disk and lower disk spring 33*a* interact in the same manner.

The invention is not limited by the embodiments described above which are presented as examples only but can be modified in various ways within the scope of protection defined by the appended patent claims.

We claim:

1. A piston of a piston-cylinder unit for dividing a cylinder of the piston-cylinder unit into two spaces, said piston comprising:

a piston body having a center axis and passages around said center axis for connecting the two spaces of the cylinder;

a centering sleeve centered relative to said center axis of said piston body;

a disk element covering said passages and centered relative to said center axis of said piston body by said centering sleeve; and a spring element arranged between said piston body and said centering sleeve, said spring element spacing said centering sleeve from said piston body during assembly of said piston and thereby displacing a useful range of said centering element until said piston is in its assembled state and said disk element occupies its intended position.

2. The piston of claim 1, wherein said spring element comprises a wave spring.

3. The piston of claim 1, wherein said centering element comprises a first centering element on a first side of said piston body and a second centering element on a second side of said piston body and wherein said first and second centering elements have the same height.

4. The piston of claim 1, further comprising a planar supporting disk mounted on said disk element and a tilting disk inserted between said disk element and said planar supporting disk.

* * * * *